No. 776,607. PATENTED DEC. 6, 1904.
M. B. MILLER.
AUTOMATIC CREAM COOLER.
APPLICATION FILED JULY 14, 1902.
NO MODEL. 2 SHEETS—SHEET 1.

WITNESSES:
F. J. Larson
W. E. Windsor

INVENTOR:
Martin B. Miller
BY Geo. W. Sues
Attorney.

No. 776,607. PATENTED DEC. 6, 1904.
M. B. MILLER.
AUTOMATIC CREAM COOLER.
APPLICATION FILED JULY 14, 1902.
NO MODEL. 2 SHEETS—SHEET 2.
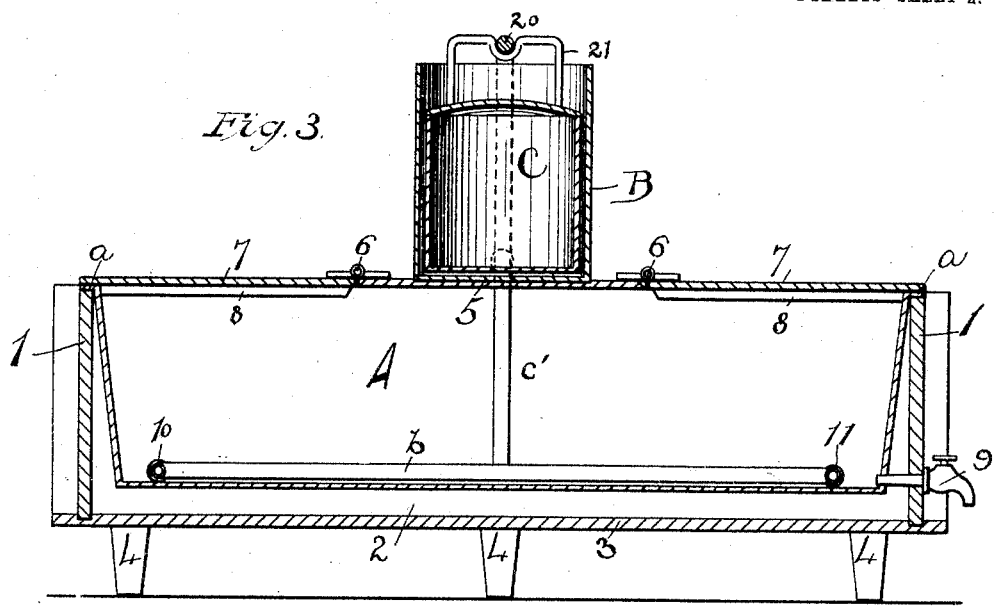
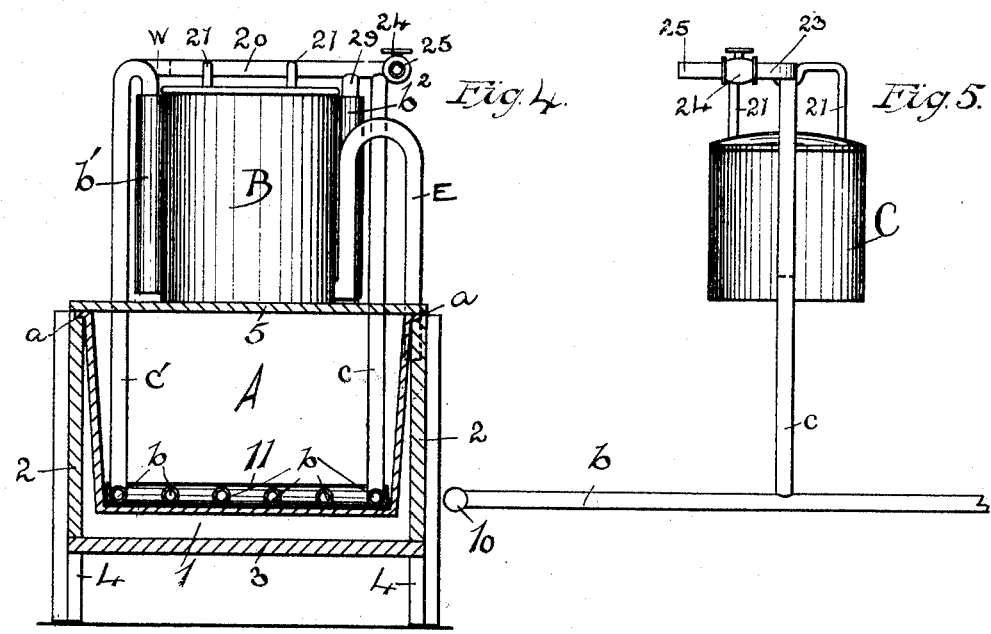
WITNESSES:
F. J. Larson.
W. E. Windsor.
INVENTOR:
Martin B. Miller
BY Geo. W. Sues
Attorney.

No. 776,607. Patented December 6, 1904.

UNITED STATES PATENT OFFICE.

MARTIN B. MILLER, OF OMAHA, NEBRASKA, ASSIGNOR, BY MESNE ASSIGNMENTS, TO MARY WILHELMINA MILLER, OF OMAHA, NEBRASKA.

AUTOMATIC CREAM-COOLER.

SPECIFICATION forming part of Letters Patent No. 776,607, dated December 6, 1904.

Application filed July 14, 1902. Serial No. 115,588. (No model.)

*To all whom it may concern:*

Be it known that I, MARTIN B. MILLER, residing at No. 1814 Binney street, Omaha, in the county of Douglas and State of Nebraska, have invented certain useful Improvements in Automatic Cream-Coolers; and I do hereby declare that the following is a full, clear, and exact description of the invention, such as will enable others skilled in the art to which it appertains to make and use the same, reference being had to the accompanying drawings, which form a part of this specification.

This invention relates to a novel improvement in automatic cream-coolers.

The aim of my invention is to provide a tank within which is held the cream and within which reciprocate upward and downward a system of cooling-pipes to automatically cool the milk, as will be described more fully hereinafter and finally pointed out in the claim.

Figure 1:
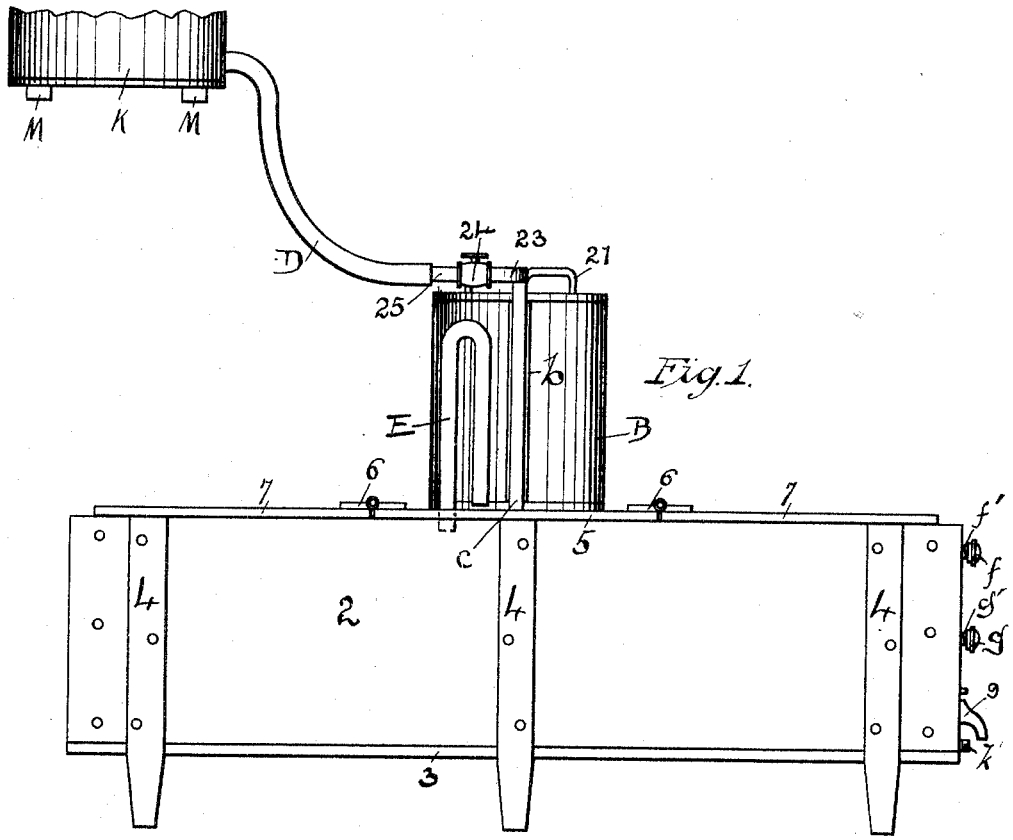
Figure 2:
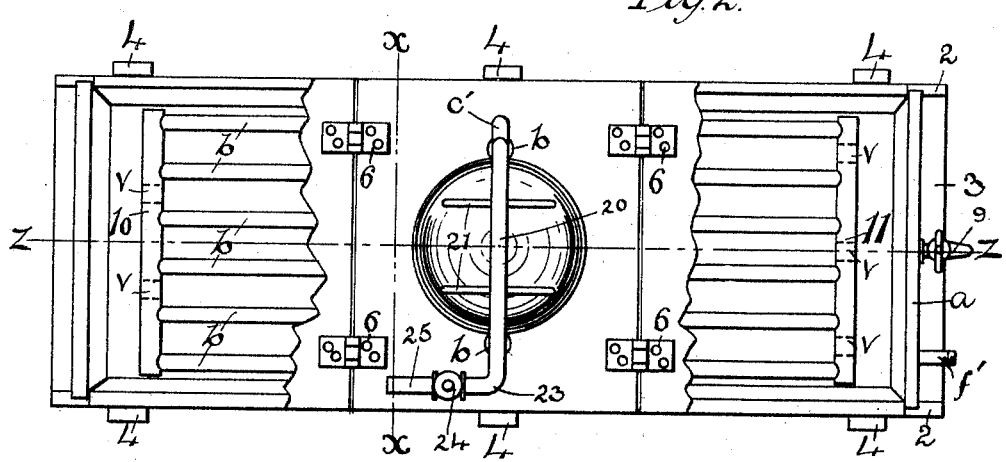

In the accompanying drawings I have shown in Figure 1 a side elevation, with portions removed, of an automatic cream-cooler embodying my invention. Fig. 2 shows a top view with portions broken away. Fig. 3 shows a sectional view on line Z to Z in Fig. 2. Fig. 4 shows a view on line X to X in Fig. 2, while Fig. 5 shows a detail of the float as used in my invention.

In carrying out the aim of my invention I provide an ordinary trough comprising the bottom 3, the two sides 2 2, and the end pieces 1 1. This trough is supported by means of the legs 4 4. Held within this trough is a cooling-tank A, preferably copper, which has its upper ends flanged outward, as is shown at $a$, so that the receptacle may be secured within the trough. This receptacle or cooling-tank A is used to contain the milk and is preferably made of thin sheet-copper. Covering this receptacle or cooling-tank and being secured to the trough is the transverse central cover portion 5, provided with the hinges 6 6, as is shown more clearly in Fig. 2, which hinges support the two covers 7 7. This trough has one of its ends 1 provided with a series of three pipes, (shown in Fig. 1,) which are positioned along one side, these pipes being marked $f'$, $g'$, and $k'$. Extending from one of these pipes is an ordinary exit tube or pipe, which is conducted to a suitable sewer or other point adapted to receive the waste-water from the trough. Two of these pipes are always provided with caps, as shown at $f$ and $g$, the third pipe being adapted to receive the exit-tube.

Extending from the milk-holding receptacle A is a suitable drain-cock 9, as is clearly shown in Fig. 3. Secured to the top 5 is an ordinary water-tank B, which upon its sides and at opposite points is provided with the open-ended tubular portions $b$, as is shown in Fig. 4. Emptying from the bottom of this water-tank B is a gooseneck or siphon E, which empties into the trough adjacent the receptacle A, as disclosed in dotted lines in Fig. 4.

Held within the receptacle or cooling-tank A is a pipe-cooling system comprising the two end pipes 10 and 11, which pipes are plugged at suitable points, as is indicated by dotted lines at $v$ in Fig. 2, so that the water passing through the pipes circulates from side to side within this pipe system. These end pipes 10 and 11 are connected by a plurality of longitudinal pipes $b$, as is indicated in Fig. 2. Extending from one of the pipes $b$ is the upwardly-extending intake-pipe $c$, which empties into a pipe 20, which at one end, as is shown in Fig. 4, is plugged, and curves, as is shown at 23, at the end of which is a stop-cock 24, from which extends a suitable pipe 25, adapted to be connected to a suitable water-supply.

If desired, an ordinary tank K may be used, as is shown in Fig. 1, supported by means of suitable sills M, and from this tank K extends a preferably rubber tube D, secured to the pipe 25. Now the water entering the pipe 23 is directed down the exit-pipe $c$ and then from side to side within the pipes $b$, finally continuing up the pipe $c'$, which is then in the form of a gooseneck, and again flows downward into the tube $b'$, which below communicates with the tank B. The remaining tube $b^2$, secured to this tank B, is open-ended. Extending downward from the central tube 20, as shown in Fig. 4, is a blind tube 29, working within the tube $b^2$, so that these pipes $c$ and $c'$ are guided by means of the recurved end of the pipe $c'$ and the blind pipe 29. It will be noticed that these pipes $b'$ and $b^2$ are a little longer than the depth of the receptacle A.

Now the operation of my device is as follows: The water entering the pipe 23 is regulated by the stop-cock 24 and flows downward through the tube $c$, the longitudinal pipe $b$ and the end tubes 10 and 11 forming a coil, and empties through the pipe $c'$ into the water-tank B. Now within this tank B is held a float C, as shown in Fig. 5, which by means of the brackets 21 is secured to the pipe 20. A certain amount of milk having been placed into the receptacle A, we will assume, sufficient to come within the receptacle A to a point approximately opposite the upward exit-pipe $f'$, the exit or escape tube is then secured to this pipe $f'$ and the cap $f$ used to close the lower pipe $k$. It is desirable to take the water at a point near the height of the cream within the receptacle A, as if there is more water within the trough than there is milk within the receptacle A the water has a tendency to bulge inward and strain the thin copper receptacle A. This receptacle is made thin, so as to be more easily sensitive to temperature. Now as the water empties through this pipe $c'$ into the tank B and rises therein it raises the float C, and this float is made of a capacity sufficient to raise the system of cooling-pipes, so that as the float C rises it carries up the system of cooling-pipes. This occurs until the water within the tank B finds an outlet through the gooseneck E and enters into the trough to cool the receptacle A and finding an escape through the pipe $f'$. As soon as the water finds an escape through the siphon E the float will gradually recede as the water is exhausted, so that the cooling-pipe system is again brought to the bottom of the receptacle. While the water enters this tank B at all times, the siphon is arranged to exhaust much more quickly than water enters, so that by the means of this float and the various connections this pipe-cooling system is normally reciprocating upward and downward as long as the water-supply enters the tank B.

The pipe system is exceedingly simple and comprises simply a straight pipe $b$ and the straight end pipes 10 and 11, and this is quite essential, as it is absolutely necessary that these cooling-pipes be kept sweet and clean.

In Fig. 5 I have shown the method I prefer employing in securing the float C to the pipe-cooling system.

This device may be made in suitable sizes.

Having thus described my said invention, what I claim as new, and desire to secure by United States Letters Patent, is—

The combination with a trough, of a cooling-tank held within said trough, a superposed water-tank, a siphon extending from the bottom of said water-tank into said trough, a cooling-coil, a gooseneck extending upward from said cooling-coil and emptying into said water-tank, a float held within said water-tank, a means to connect said float to said cooling-coil.

In testimony whereof I affix my signature in presence of two witnesses.

MARTIN B. MILLER.

Witnesses:
   GEORGE W. SUES,
   FREDERICK J. LARSON.